United States Patent [19]

Moyer et al.

[11] Patent Number: 4,862,352
[45] Date of Patent: Aug. 29, 1989

[54] DATA PROCESSOR HAVING PULSE WIDTH ENCODED STATUS OUTPUT SIGNAL

[75] Inventors: William C. Moyer, Dripping Springs; Jay A. Hartvigsen; Russell C. Stanphill, both of Austin, all of Tex.

[73] Assignee: Motorola, Inc., Schaumburg, Ill.

[21] Appl. No.: 97,032

[22] Filed: Sep. 16, 1987

[51] Int. Cl.[4] .......................... G06F 9/38; G06F 13/26
[52] U.S. Cl. .............................. 364/200; 364/231.8; 364/242.1; 364/264.1; 364/264.2
[58] Field of Search .............................. 364/200, 900

[56] References Cited

U.S. PATENT DOCUMENTS

| | | | |
|---|---|---|---|
| 4,443,848 | 4/1984 | Gehman | 364/200 |
| 4,608,630 | 8/1986 | Schott | 364/200 |
| 4,615,005 | 9/1986 | Maejima et al. | 364/200 |
| 4,636,656 | 1/1987 | Snowder et al. | 364/900 |
| 4,653,018 | 3/1987 | Stadlmeier et al. | 364/900 |
| 4,760,519 | 7/1988 | Papworth et al. | 364/200 |
| 4,788,639 | 11/1988 | Tamaru | 364/200 |

Primary Examiner—Jerry Smith
Assistant Examiner—James J. Kulbaski
Attorney, Agent, or Firm—Robert L. King

[57] ABSTRACT

A data processor is provided with status logic for monitoring the instruction processing activity therein, and for providing a pulse width encoded status output signal having either a first duration if the next instruction is to be executed in a normal sequence, or a second duration if an exception condition has occurred which will delay or prevent the execution of the next instruction. In the preferred form, the status logic can detect various types of exception conditions in the CPU and will assert the status signal for respective durations for each such type. In a data processor having an internal instruction pipeline, the status logic may also monitor changes in the flow of instructions, and provide a "refill" signal to indicate that the prefetched instructions in the pipeline have be discarded.

9 Claims, 4 Drawing Sheets

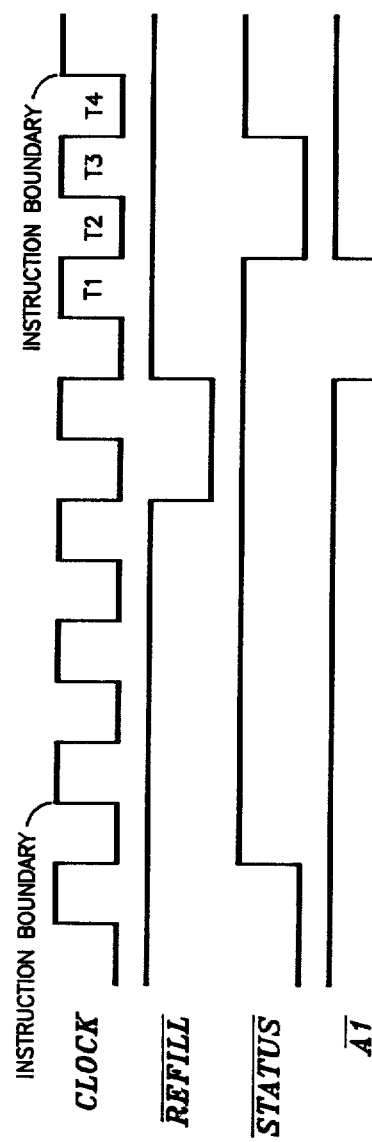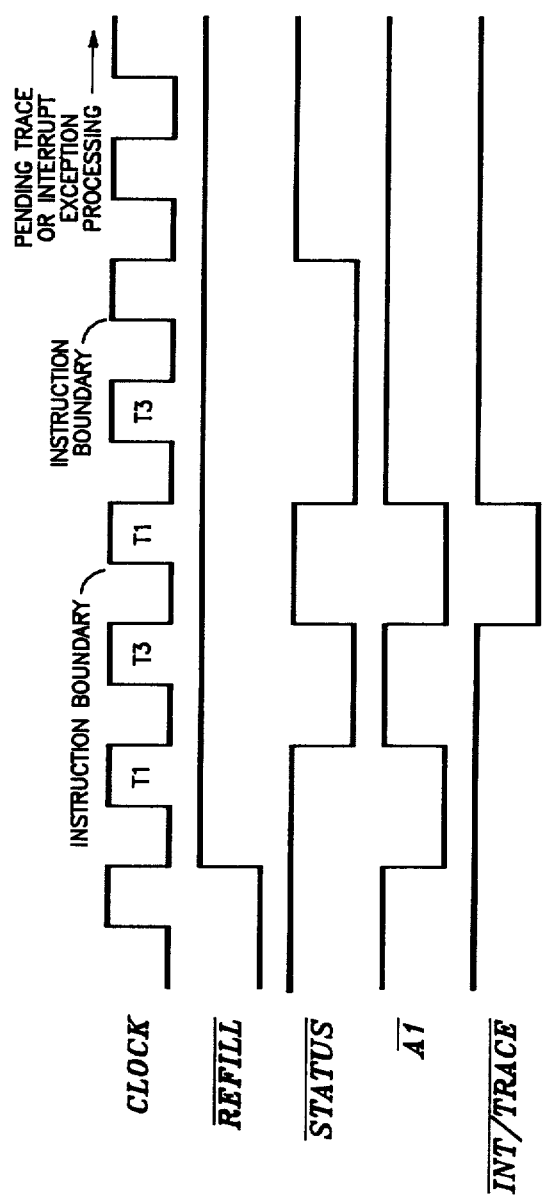

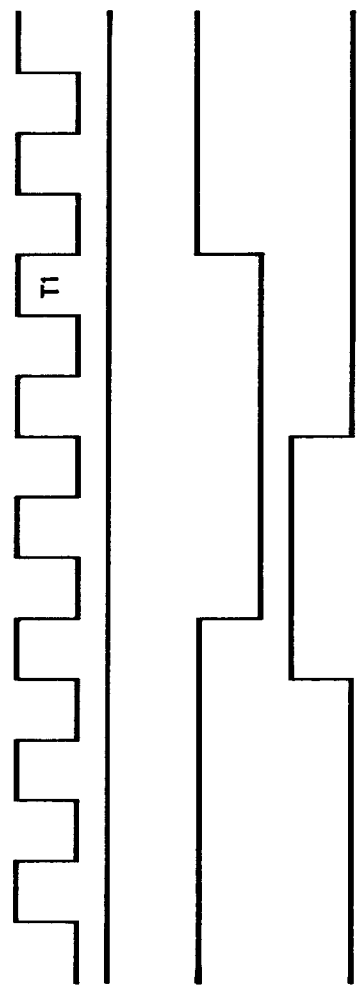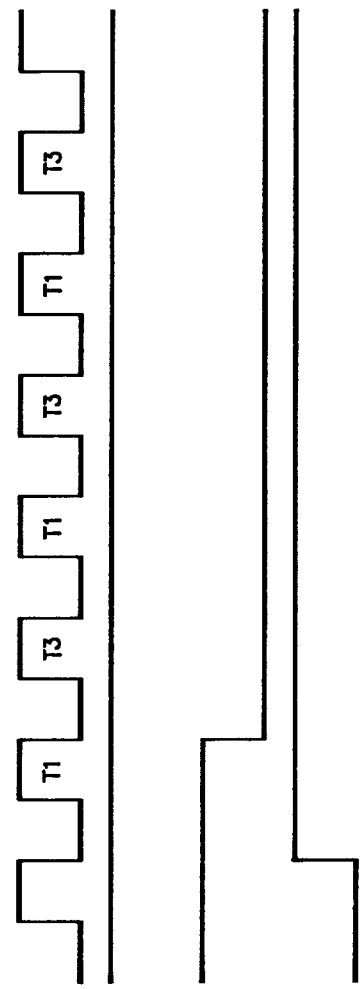

DATA PROCESSOR HAVING PULSE WIDTH ENCODED STATUS OUTPUT SIGNAL

FIELD OF THE INVENTION

The subject invention relates generally to data processors and, more particularly, to a data processor which provides a pulse width encoded output signal to indicate the internal status thereof.

BACKGROUND ART

In certain types of data processing applications, such as emulators and development systems, it is very important to be able to track the course of execution of instructions by the data processor. In many data processors, the internal status of the processor can be determined by monitoring and interpreting the various output signals provided by the processor in the normal course of operation. On the other hand, some events, such as instruction tracing or interrupt exceptions, are difficult to track from outside the processor. In some processors in which some important events are not otherwise externally discernable, special output signals are provided whenever such an event occurs, with each output signal indicating a given type of event. In other processors, internal logic is provided to monitor the status of the processor and to provide an encoded set of "status" signals which indicate the internal status of the processor. An example of such encoding logic is set forth in U.S. Pat. No. 4,270,167 wherein three (3) output signals (S2, S1 and S0) are suitably encoded to indicate the various relevant states of the processor.

In certain processors, such as one having an internal instruction queue or pipeline, the interactions of the processor with the queue or pipeline are not readily discernable from outside the processor. In such systems, these events are made externally "visible" by special logic which monitors such activities, and provides a set of "status" signals which indicate when the monitored events occur. An example of such logic is also set forth in U.S. Pat. No. 4,270,167 wherein two (2) output signals (QS1 and QS0) are suitably encoded to indicate the various relevant queue activities.

In systems having instruction or data caches which are tightly coupled to the processor, the interactions between the processor and the cache(s) may also not be readily discernible to external devices. However, in software or hardware development or emulation systems, it is critical to be able to track the activities of the processor as it processes the instructions and data as they flow into and out of the caches.

In general, providing non-encoded status signals requires as many distinct output signals as there are monitored status conditions. Even encoding the status conditions requires a sufficient number of distinct output signals to accommodate the encoding scheme. Since the number of output signals available for use by integrated circuit processors is very limited, a mechanism for indicating the current status of a plurality of different operating conditions using a minimum of distinct output signals is desirable.

SUMMARY OF THE INVENTION

Accordingly, it is an object of the present invention to provide a mechanism wherein the status of a plurality of different operating conditions may be pulse width encoded on a single output signal.

Another object of the present invention is to provide a method for pulse-width encoding the status of a plurality of different operating conditions on a single output signal.

These and other objects are achieved in a data processor which sequentially executes each of a plurality of instructions except in response to the occurrence of at least one exception condition. In accordance with the present invention, the processor includes first logic for determining that the next instruction is to begin execution, and providing a first control signal in response thereto; second logic for detecting the occurrence of an exception condition, and providing a second control signal in response thereto; and third logic for receiving the first and second control signals, and providing an output signal from the data processor for a first predetermined duration in response to receiving the first control signal and for a second predetermined duration in response to receiving the second control signal. If, as in the preferred form, more than one exception condition may occur during the execution of the instruction, the duration of the output signal is different and distinct for each different type of exception condition.

BRIEF DESCRIPTION OF THE DRAWINGS

FIGS. 2a, 2b, 2c and 2d each illustrate in graphical form the timing of signals associated with the status logic of FIG. 1.

DESCRIPTION OF THE INVENTION

Figure 1:
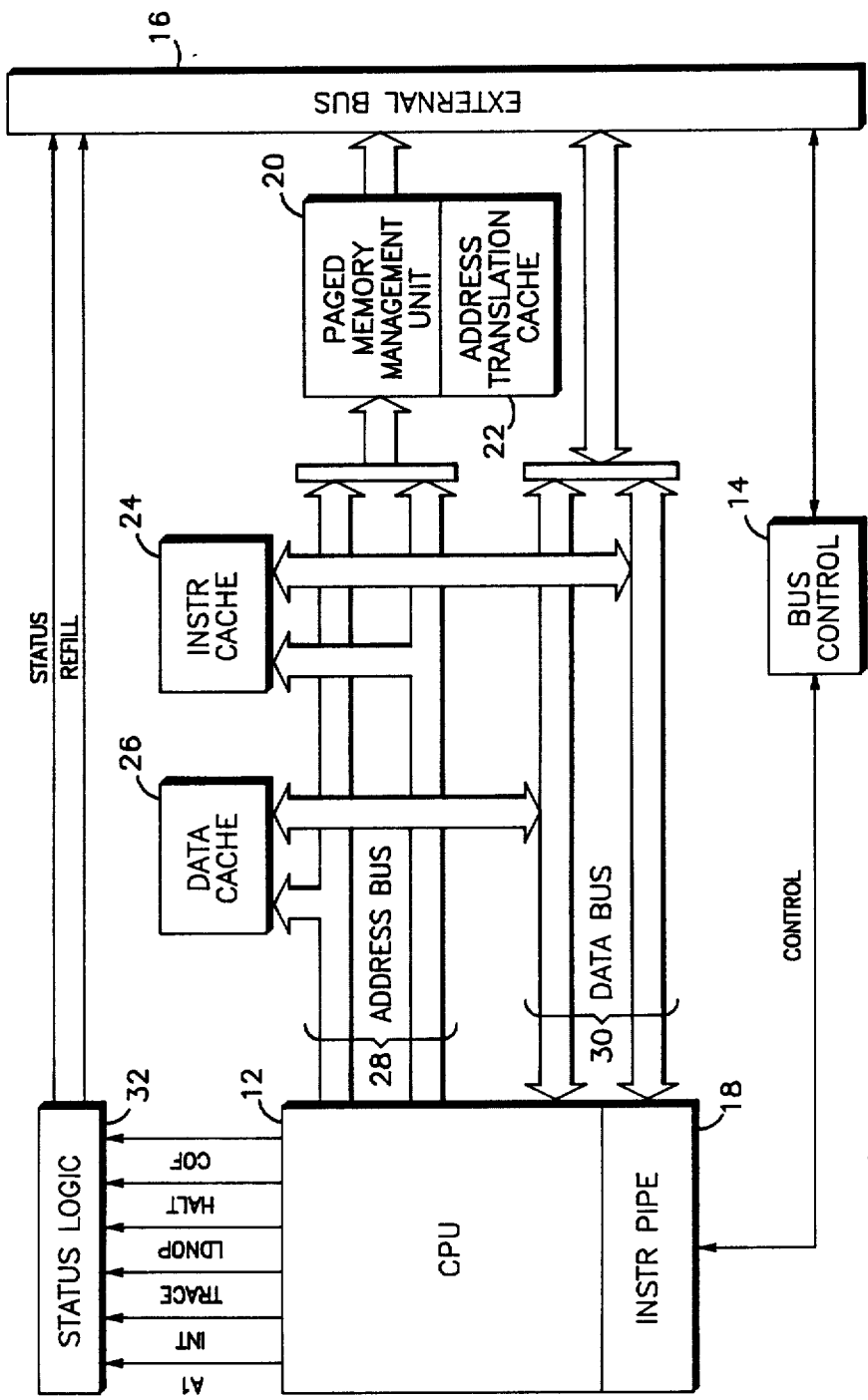
FIG. 1 illustrates in block diagram form, a data processor adapted in accordance with the present invention.

Shown in FIG. 1 is a data processor 10 in which a central processing unit (CPU) 12 cooperates with a bus controller 14 to transfer sequences of instructions comprising programs from a memory system (not shown) via an external bus 16 into an instruction pipeline 18. As required for the execution of these instructions, the CPU 12 will request the bus controller 14 to transfer data operands to or from the memory system via the bus 16. In the illustrated form, a paged memory management unit (PMMU) 20, having an associated address translation cache (ATC) 22, translates the logical addresses provided by the CPU 12 into corresponding physical addresses in the memory system. To improve the execution rate of the CPU 12, an instruction cache 24 and a data cache 26 are provided to temporarily retain recently retrieved instructions and data operands, respectively. To assure optimum utilization of the caches 24 and 26, a dual address bus 28 and a dual data bus 30 are provided to form a Harvard architecture.

In accordance with the present invention, the processor 10 includes status logic 32 which receives several of the signals which indicate the operating condition of the CPU 12. During normal instruction execution, the CPU 12 will provide an A1 signal immediately before beginning the execution of the next instruction in the instruction pipeline 18. In the event that an interrupt is received from an external source (not shown) via the external bus 16, the CPU 12 will provide an INT signal. If the CPU 12 has been directed to "trace" the execution of each instruction (such as via a "trace" bit in an appropriate control register (not shown) within the CPU 12), the CPU 12 will provide a TRACE signal immediately before beginning trace activity following the execution of each instruction. In the event that any other typical type of exception condition should occur (such as a bus fault, an address error, a miss/fault by the PMMU 20 or an error in the instruction pipeline 18), the CPU 12 will provide a LDNOP signal to indicate that a pause has occurred in the normal execution sequencing. In the event that a catastrophic error has occurred (such as a double bus fault, or, if the CPU 12 is of the microprogrammable type, a bad microaddress), the CPU 12 will provide a HALT signal to indicate that instruction execution has been halted. In any case, whenever a situation occurs which requires a change in the flow of instructions, so that the instructions that have been prefetched into the instruction pipeline 18 must be discarded, the CPU 12 will provide a change-of-flow (COF) signal.

Figure 3:
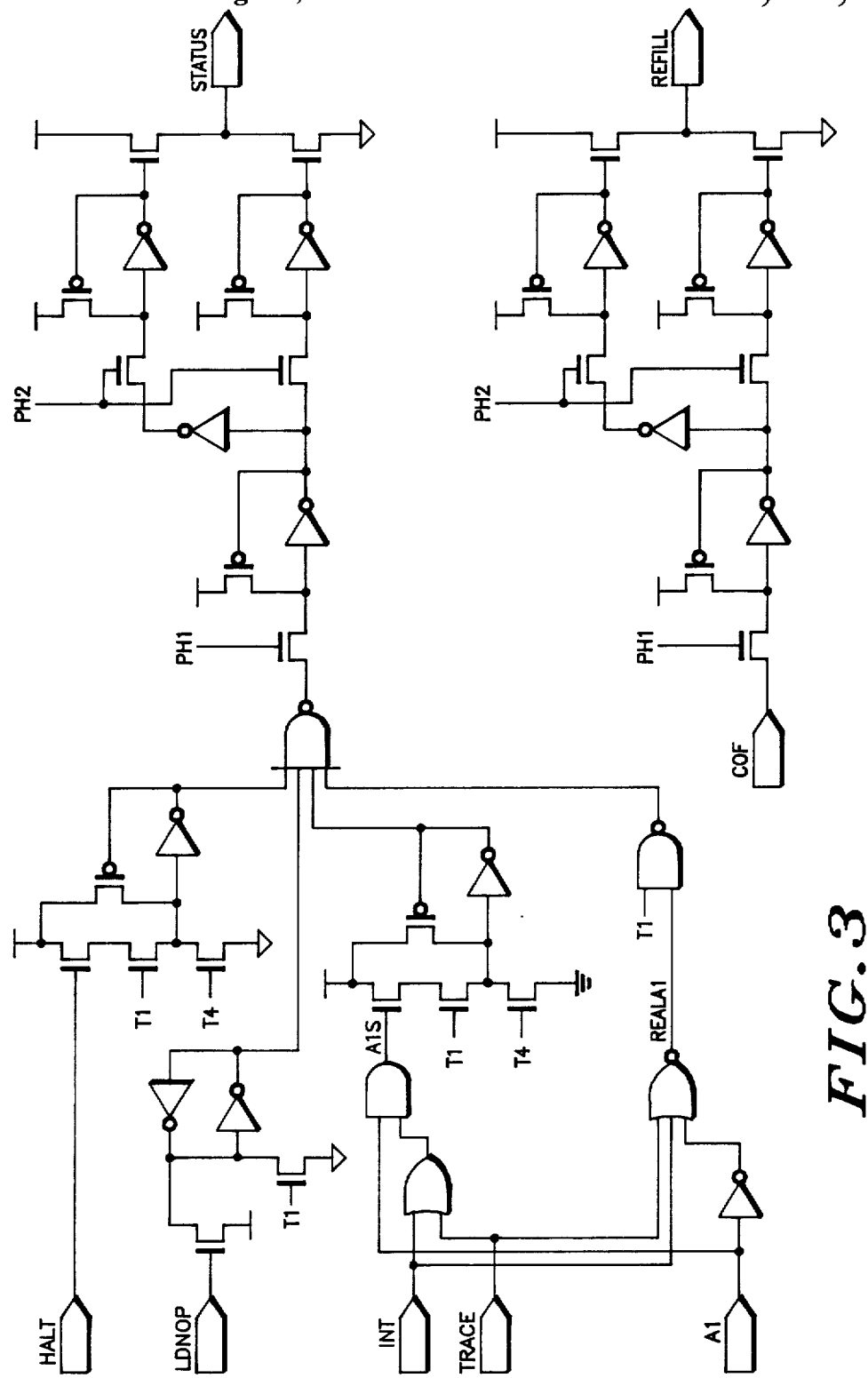
FIG. 3 illustrates a preferred embodiment of the status logic of FIG. 1.

As shown in FIG. 2a, the status logic 32 will provide a STATUS signal via the external bus 16 which is One (1) clock period in duration, beginning One and one-half (1.5) clock period before the start of execution of the next instruction, in response to receiving the A1 signal and the falling of the clock signal during a time period labeled "T3". If either the INT or the TRACE signals are received at the same time that the A1 signal is received, the status logic 32 will provide the STATUS signal for One and one-half (1.5) clock periods, beginning One and one-half (1.5) clock periods before the initiation of the interrupt or the trace processing activity, respectively, as shown in FIG. 2b. In the preferred form, the status logic 32 will also immediately assert a REFILL signal via the external bus 16 for One (1) clock period in response to the COF signal provided by the CPU 12, as shown in FIG. 3.

In response to receiving the LDNOP signal, the status logic 32 will assert the STATUS signal for Three (3) clock periods, beginning on the next falling clock edge, as shown in FIG. 2c. As shown in FIG. 2d, if the HALT signal is received, the status logic 32 will on the next falling clock edge assert the STATUS signal and will continue to do so until the CPU 12 is reset.

The following table, summarizes the previously described logic functions:

| PROCESSOR CONDITION | STATUS LOGIC INPUTS | STATUS OUTPUT |
| --- | --- | --- |
| At Normal Instruction Boundary | A1 signal asserted; INT, TRACE, LDNOP, HALT signals negated | Asserts for 1 clock period, beginning 1.5 clocks before Instruction Boundary |
| At Instruction Boundary with Trace or Interrupt Exception Pending | A1 signal asserted and TRACE or INT signal(s) asserted; LDNOP and HALT signals negated | Asserts for 2 clock periods, beginning 1.5 clocks before Instruction Boundary |
| Pause in Normal Instruction Processing Due to Other Non-Catastrophic Exception Condition | LDNOP signal asserted; HALT signal negated; other signals are don't cared | Asserts for 3 clock periods, beginning 0.5 clock periods after LDNOP asserts |
| Catastrophic Exception Condition | HALT signal asserted; other signals are don't cared | Asserts continuously beginning 1 clock period after HALT is asserted. |

A detailed logic implementation of the status logic 32 is shown in FIG. 3. However, various changes may be made to the structure or operation of the status logic 32 to facilitate the use thereof in particular data processors without departing from the spirit and scope of the present invention.

We claim:

1. In a data processor having a processing unit for sequentially executing each of a plurality of instructions except in response to an occurrence of a first exception condition, the improvement comprising:

first means for receiving a first operating condition signal from the processing unit indicating that a next one of said plurality of said instructions is to begin execution, and providing a first control signal in response thereto;

second means for detecting the occurrence of said first exception condition by receiving a second operating condition signal from the processing unit, and providing a second control signal in response thereto; and third means for receiving the first and second control signals, and providing at a single output terminal external to said data processor a single output signal for a first predetermined duration in response to receiving the first control signal and for a second predetermined duration in response to receiving the second control signal.

2. The data processor of claim 1 wherein the instructions are sequentially executed in response to the occurrence of either said first exception condition or a second exception condition, the improvement further comprising:

fourth means for detecting the occurrence of said second exception condition by receiving a third operating condition signal from the processing unit, and providing a third control signal in response thereto;

said third means also receiving the third control signal, and providing the single output signal external to said data processor for a third predetermined duration in response to receiving the third control signal.

3. The data processor of claim 2 wherein the execution of at least one of said instructions requires the data processor to change the flow of said instructions, the improvement further comprising:

fifth means for detecting said change of flow by receiving a fourth operating condition signal from the processing unit, and providing a second output signal from said data processor in response thereto.

4. The data processor of claim 3 wherein the data processor halts the execution of said instructions in response to a third exception condition, the improvement further comprising:

sixth means for detecting the halting of the data processor by receiving a fifth operation condition signal from the processing unit, and providing a fourth control signal in response thereto;

said third means also receiving the fourth control signal, and providing the first output signal external to said data processor for a fourth predetermined duration in response to receiving the fourth control signal.

5. The data processor of claim 2 wherein the data processor halts the execution of said instructions in response to a third exception condition, the improvement further comprising:

fifth means for detecting the halting of the data processor by receiving a fourth operating condition signal from the processing unit, and providing a fourth control signal in response thereto;

said third means also receiving the fourth control signal, and providing the single output signal from said data processor for a fourth predetermined duration in response to receiving the fourth control signal.

6. The data processor of claim 1 wherein the execution of at least one of said instructions requires the data processor to change the flow of said instructions, the improvement further comprising:

fourth means for detecting said change of flow by receiving a third operating condition signal from the processing unit, and providing a second output signal from said data processor in response to receiving the third operating condition signal.

7. The data processor of claim 6 wherein the data processor halts the execution of said instructions in response to a second exception condition, the improvement further comprising:

sixth means for detecting the halting of the data processor by receiving a fourth operating condition signal from the processing unit, and providing a fourth control signal in response thereto;

said third means also receiving the fourth control signal, and providing the first output signal from said data processor for a second predetermined duration in response to receiving the fourth control signal.

8. The data processor of claim 1 wherein the data processor halts the execution of said instructions in response to a second exception condition, the improvement comprising:

fourth means for detecting the halting of the data processor by receiving a third operating condition signal from the processing unit, and providing a third control signal in response thereto;

said third means also receiving the third control signal, and providing the single output signal from said data processor for a second predetermined duration in response to receiving the third control signal.

9. In a data processor for sequentially executing each of a plurality of instructions, the execution of at least one of said instructions requiring a change of flow of said instructions to be made by the data processor, the improvement comprising:

first means for detecting said change of flow, and providing a first control signal in response thereto; and second means for receiving the first control signal, and providing a first output signal external to said data processor in response to receiving the first control signal;

wherein the data processor sequentially executes each of said instructions except in response to an occurrence of a first exception condition, the improvement further comprising:

third means for determining that a next one of said plurality of said instructions is to begin execution, and providing a second control signal in response thereto;

fourth means for detecting the occurence of said first exception condition, and providing a third control signal in response thereto; and fifth means for receiving the second and third control signals, and providing a second output signal external to said data processor for a first predetermined duration in response to receiving the second control signal and for a second predetermined duration in response to receiving the third control signal.

* * * * *